Oct. 26, 1965  G. ALFIERI  3,214,188
DEVICE FOR SELECTIVELY DEACTIVATING A TRACTOR
PNEUMATIC SUSPENSION
Filed June 12, 1961  3 Sheets-Sheet 1

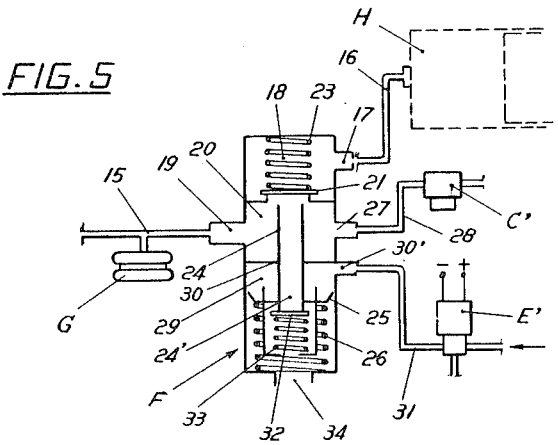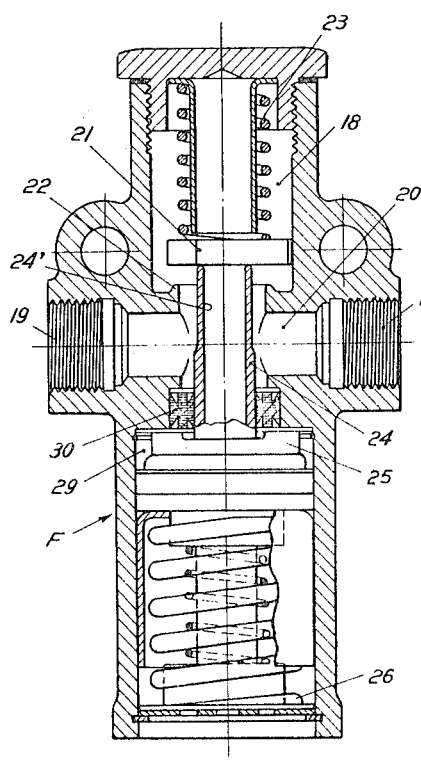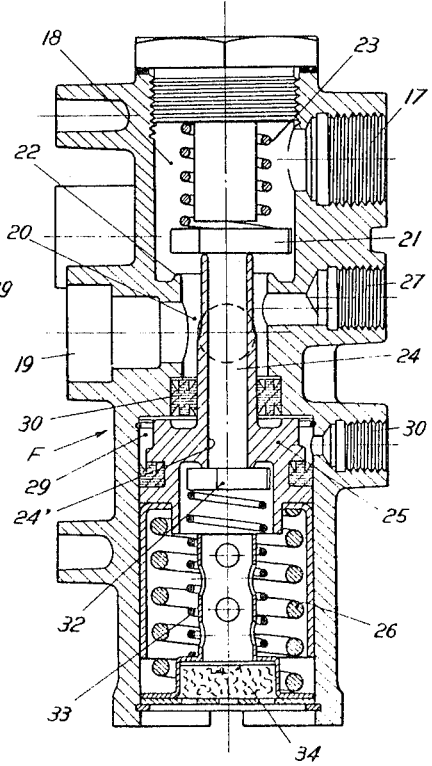

United States Patent Office 3,214,188
Patented Oct. 26, 1965

3,214,188
DEVICE FOR SELECTIVELY DEACTIVATING A TRACTOR PNEUMATIC SUSPENSION
Giuseppe Alfieri, Milan, Italy, assignor to Fabbrica Italiana Magneti Marelli S.p.A., Milan, Italy, a corporation of Italy
Filed June 12, 1961, Ser. No. 116,341
Claims priority, application Italy, June 24, 1960, 4,610
5 Claims. (Cl. 280—124)

The present invention relates to a device for selectively deactivating a tractor pneumatic suspension.

In semi-articulated vehicles during the hitching and unhitching of the semi-trailer of the tractor it is necessary to be able to reduce the reaction of the rear suspensions of the tractor. In fact for effecting the operations, it is necessary for the tractor to readily get out from, or in under, the trailer. In the case of semi-articulated trailers having a fifth wheel and provided with a pneumatic suspension, the unhooking operation presents some difficulty, inasmuch, if the levellers are deactivated the pressure existing in the air springs tends to lift the tractor, the frame of which follows the lifting movement of the front portion of the semi-trailer, which lifting is effected by operating the jacks of the auxiliary wheels of the semi-trailer itself. The lifting of the rear portion of the tractor is all the more greater when a heavy load is carried on the front portion of the semi-trailer.

The aim of the present invention is to avoid the above mentioned drawback, and the device is substantially characterized by the fact that it comprises at least one discharge valve inserted in the feeding system of the air springs, which valve is pneumatically opened by means of an electrically actuated three way valve, the minimum pressure in the air springs being determined by at least one spring, the load whereof determines, at the pre-established magnitude of the minimum pressure, the closure of the discharge conduit.

By this construction and arrangement, the rear portion of the tractor, when the load is removed therefrom, does not lift because its suspension remains inactive, and therefore does not expand; hence, the trailer can be disconnected from the tractor with a limited hoisting of the front portion of the trailer.

The invention will be described with reference to the schematic appended drawings, description and drawings being given only as a non-limitative example.

FIGURE 5 is a schematic diagram of a pneumatic suspension system incorporating another embodiment of the device of the present invention;

FIGURE 6 is a side elevational view, partially in section, of the device incorporated in the system illustrated in FIGURE 5;

FIGURE 7 is an orthogonal, sectional view, of the device illustrated in FIGURE 6.

Figure 1:
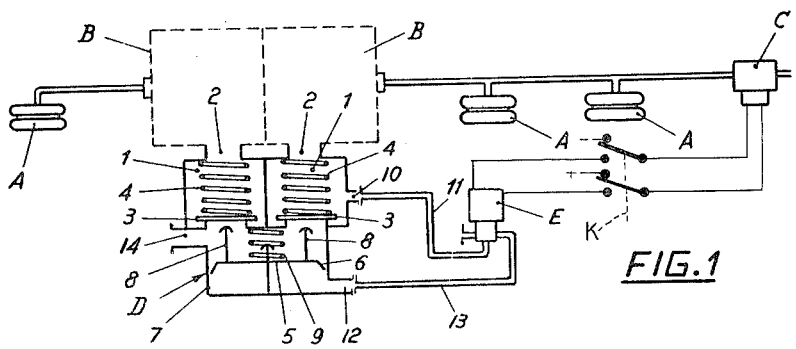
FIGURE 1 is a schematic diagram of a pneumatic suspension system incorporating the device of the present invention for reducing the pressure in the air springs in the rear suspension of a tractor.
Figure 2:
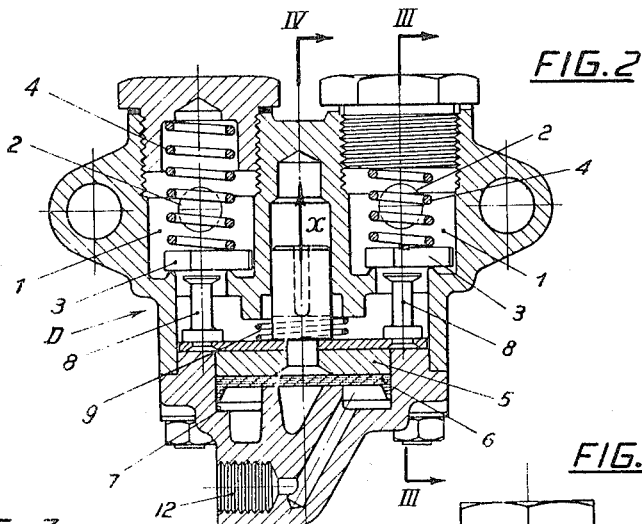
FIGURE 2 is a side elevational view, in section, of the device of the present invention.
Figure 3:
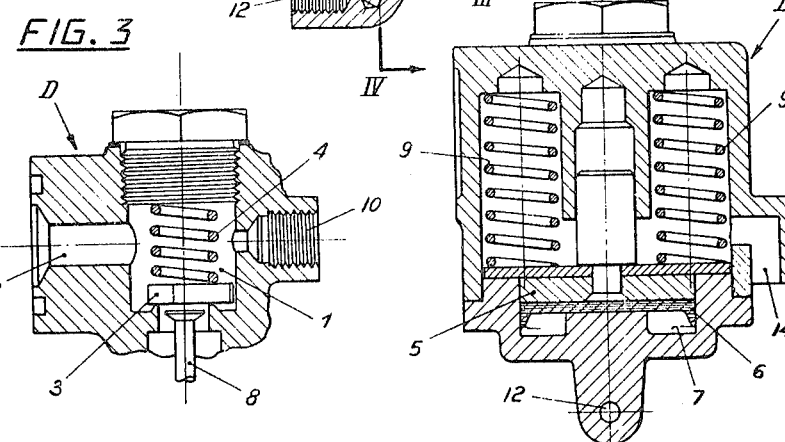
FIGURE 3 is a fragmentary, sectional view of the device taken along line III—III of FIGURE 2.
Figure 4:
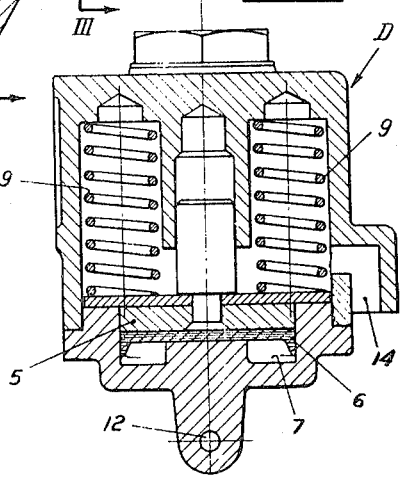
FIGURE 4 is a sectional view taken along line IV—IV of FIGURE 2.
Figure 8:
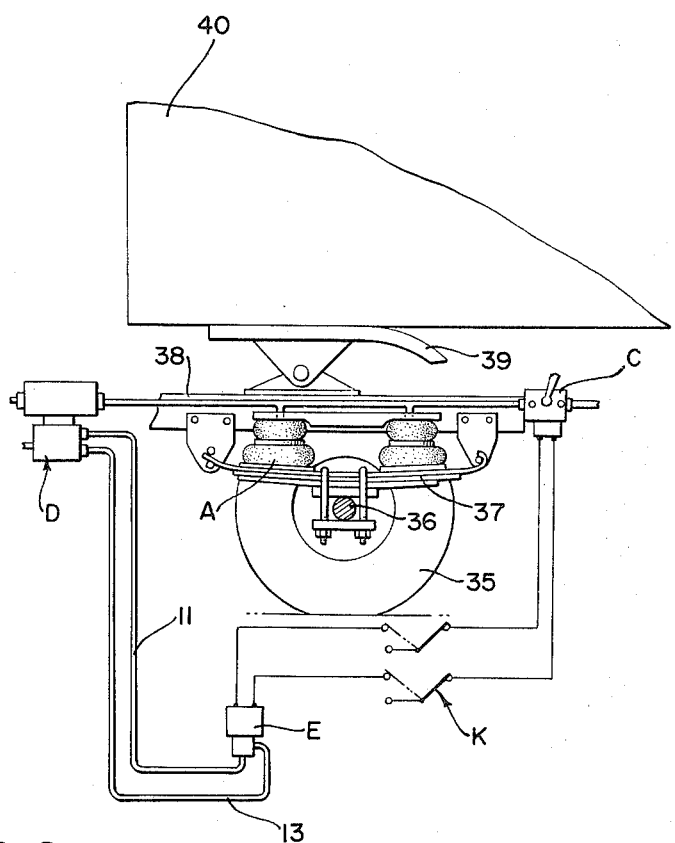
FIGURE 8 is a fragmentary, side elevational view, showing the general arrangement of the device of the present invention incorporated in the rear suspension of a tractor.

Referring to the drawings, and more particularly to FIGURES 1 to 4 and 8, the tractor pneumatic suspension comprises a pair of air springs A mounted between the unsprung and sprung portions of the tractor, it being well understood by those skilled in the art that the unsprung portion of the tractor refers to the vehicle wheels 35 (FIGURE 8), axle 36 and leaf springs 37, while the sprung portion includes the vehicle frame 38 upon which the tractor fifth wheel 39 is carried for connecting the tractor to a trailer 40.

The air springs communicate with an air reservoir provided with a diaphragm for dividing the reservoir into two equal volume chambers B, one of the chambers communicating with the air springs on one side of the tractor and the other chamber communicating with the air springs on the opposite side of the tractor.

In FIGURE 1, the levelling valve C may be of any well-known type; e.g., the levelling valve disclosed in U.S. Patent No. 3,044,495 by the same inventor. The device according to the invention comprises a body D, the two chambers 1 whereof are each connected through the opening 2 with one of the chambers B of the supplementary volumes of the suspension. Each of the chambers 1 is closed by a valve 3 kept against its seat by the air pressure in the supplementary reservoirs B and by the spring 4.

Downstream of the chambers 1 in respect to the closure valve 3, there is disposed a pistons 5 with packing 6 sliding within a cylinder 7, which piston is provided with two push rods 8 which normally do not contact the valves 3.

The piston is retained in the rest position by two springs 9. One of the chambers 1 is connected through the outlet 10 with the conduit 11 at the entrance of an electrically operated three-way valve E.

The cylinder 7 in which slides the piston 5 and associated seal 6 is connected through the passage 12 and the conduit 13 to the outlet of the said electrically operated valve E.

The springs 9 of the piston are so dimensioned that when the air pressure in the pneumatic suspensions gets down to the desired value, the piston returns to the rest position and the pushers 8 permit the closure of the valves 3.

In fact, by operating the electric valve E the conduits 11 and 13 are put in communication whereas with the valve closed the conduit 11 is closed and the conduit 13 is discharging and therefore if the pressure in the suspension has a higher value than the pre-established one the piston displaces in the direction of the arrow X and causes the opening of the valve 3. The air coming from the suspensions passes to the atmosphere through the outlet port 14. It is thus possible to obtain in the rear suspensions of the tractor the reactions corresponding to the empty tractor. This condition is limited to the time required for the hitching or unhitching of the semi-trailer; when the operation is terminated the device is excluded by de-energizing the electric valve E. In order to automatically ensure the activation and deactivation of the air springs A of the pneumatic system, said system is provided with a switch K, such that by moving the switch to a first position the electro-valve E is energized, while simultaneously de-activating the levellers C. When the switch is moved to a second position, the electric-valve E is de-energized and the levellers C are activated.

In the device according to the FIGS. 5 to 7 the supplementary reservoirs of the air springs are isolated during the phase of reduction of the reaction so as to reduce the pressure only in the air springs with the result of reducing the quantity of the air needed for the re-establishing the normal reaction. The device F is inserted in the conduit 15–16 connecting each suspension G with its own supplementary reservoir H.

The conduit 16 is connected through the passage 17 to the chamber 18 while the conduit 15 is connected, through the exit 19, with the chamber 20. Between the two chambers 18 and 20 is arranged a valve 21 which is normally kept off its seat 22 in contrast with the counteracting spring 23, by a tubular extension 24 presented by a piston 25. The latter is influenced by the spring 26 that keeps it in the position illustrated in the FIGS. 6 and 7. Thus, the suspension and the supplementary reservoir H are in communication. The chamber 20 is connected, through the opening 27 and the conduit 28 with the servo-actuatable balancer C'.

The piston 25 slides within the cylinder 29, which is separated from the chamber 20 by means of the gasket 30 which seals the tubular extension 24.

Cylinder 29 communicates through the opening 30' and the conduit 31 with the outlet mouth of a three way electrical valve E' the inlet whereof is in communication with the compressed air source of the vehicle (reservoir).

The axial bore 24' of the extension 24, terminates, at the end opposite the valve 21, with a seal for a valve 32 influenced by the spring 33, the load whereof is such that it will not permit the exit of the air from the bore 24' of the extension through the exhaust port 34 when the pressure in the suspension has dropped to a pre-established value. The operation of the device is as follows:

During normal operation leveller C' is activated, the electric valve E' is de-energized and, consequently, the cylinder 29 is in communication with the atmosphere through the conduit 31. The suspensions G communicate with the auxiliary reservoir H by the effect of the spring 26, which through the extension 24 keeps the valve 21 lifted, the bore 24' of the extension being closed by the valve 21.

When it is desired to reduce the pressure in the suspensions the electric valve E' is activated. The compressed air reservoir of the vehicle is put in communication, through the conduit 31, with the cylinder 29. The piston, overcoming the load of the spring 26 is displaced in the direction of the arrow, Y resulting in the closure of the valve 21 and, therefore, the interception of the suspension G from the auxiliary reservoir H. The upper end of the extension 24 moves away from the valve disc 21 allowing the discharge air from the suspension G through exhaust port 34 via the bore 24' of the extension, the valve 32, and the pressure pre-established by the load of the spring 33 acting on the valve 32 to prevent escape of air from the air springs when the pressure thereof has dropped to a predetermined value. In practice the embodiment details of the device may also vary, without leaving the ambit of the present industrial Letters Patent.

In the claims:

1. In a tractor-trailer pneumatic suspension system, the combination including a fifth wheel carried by the tractor frame, air springs mounted between the sprung and unsprung portions of the tractor and positioned beneath the fifth wheel, and pneumatically controlled valve means operatively connected to the tractor air springs for reducing the air pressure therein to thereby lower the tractor frame and associated fifth wheel during hitching and unhitching operations of the tractor and trailer.

2. The combination according to claim 1 wherein the pneumatically controlled valve means comprises, conduit means having one end communicating with said air springs and another end communicating with the atmosphere, valve means operatively disposed intermediate said ends, spring biasing means normally biasing said valve means to a closed position to prevent exhausting said air springs to the atmosphere, pneumatic means operatively connected to said valve means for moving the same to an open position to exhaust said air springs to the atmosphere. Solenoid valve means including a three-way valve controlling said pneumatic means and having a first port adapted to communicate with a pneumatic source, a second port communicating with said pneumatic means, and a third port vented to the atmosphere, said solenoid valve means having an energized position wherein said first and second ports are in communication and said third port is closed, and a deenergized position wherein said first port is closed and said second and third ports are in communication, and means to move said solenoid valve means between its energized and deenergized positions whereby in its energized position communication between said first and second ports causes actuation of said pneumatic means for moving said valve means to an open position and exhausting said air springs to the atmosphere to facilitate hitching and unhitching operations of the tractor and trailer.

3. The invention as recited in claim 2 wherein said pneumatic means comprises
   a piston slidably mounted within a cylinder for movement between actuated and deactuated positions,
   spring means normally biasing said piston to its deactuated position,
   push rod means secured to one side of said piston for actuating said valve means, and
   means on the opposite side of said piston establishing communication between the cylinder and the second port of said solenoid valve means.

4. The combination according to claim 2, wherein the pneumatic means comprises a piston slidably mounted within a cylinder, a hollow push rod secured to extend through the piston, one end of the push rod extending outwardly from one end of the cylinder for actuating the valve means, the opposite end of the cylinder being in communication with the atmosphere, and second spring biased valve means interposed between the opposite end of the hollow push rod and the opposite end of the cylinder, whereby when the piston is moved toward the opposite end of the cylinder, air from the air springs flows through the hollow rod through the second valve means to the atmosphere, said second valve means closing when the pressure within the air springs falls below a predetermined limit.

5. The combination according to claim 4 wherein the second valve means is operatively connected to the end of the hollow push rod within the cylinder.

References Cited by the Examiner

UNITED STATES PATENTS

| | | | |
|---|---|---|---|
| 2,692,612 | 10/54 | Drane | 137—510 |
| 2,733,931 | 2/56 | Reid | 280—440 X |
| 2,862,725 | 12/58 | Jackson. | |
| 3,121,573 | 2/64 | Alfieri. | |

FOREIGN PATENTS

| | | |
|---|---|---|
| 1,201,536 | 7/59 | France. |
| 1,213,614 | 11/59 | France. |
| 1,216,196 | 11/59 | France. |

BENJAMIN HERSH, *Primary Examiner.*

GEORGE HYMAN, Jr., LEO FRIAGLIA, A. HARRY LEVY, *Examiners.*